United States Patent [19]

Hwang

[11] Patent Number: 5,067,059

[45] Date of Patent: Nov. 19, 1991

[54] AQUARIUM ORNAMENT LAMP SOURCE

[76] Inventor: Steven Hwang, 4F., No. 6-6, Alley 1, Lane 147, Sec. 3, Hsin Yi Road, Taipei, Taiwan

[21] Appl. No.: 696,867

[22] Filed: May 8, 1991

[51] Int. Cl.$^5$ ............................................. F21V 33/00
[52] U.S. Cl. ................................. 362/101; 362/32; 362/293; 362/324; 362/398; 119/5
[58] Field of Search ................ 362/32, 101, 253, 293, 362/322, 324, 398; 40/442, 444; 119/5

[56] References Cited

U.S. PATENT DOCUMENTS 3,326,185 6/1967 Perez .............................. 362/101 X
3,749,901 7/1973 Clough ........................... 362/101 X
4,591,955 5/1986 Kallay ............................. 362/101

Primary Examiner—Stephen F. Husar
Attorney, Agent, or Firm—Fleit, Jacobson, Cohn, Price, Holman & Stern

[57] ABSTRACT

An aquarium ornament lamp source, comprising an optical fiber unit set inside an aquarium, having one end tied up together forming into a light ray input terminal and an opposite end loosely arranged into a plurality of light ray output terminals; a lamp source unit attached to the outside of the said aquarium, comprising a base plate having a color filter wheel pivoted thereto at the top and driven by a motor to rotate, a light source set in said color filter wheel at the center. Connection of power supply causes the motor to drive the color filter wheel to rotate and simultaneously causes the light source to emit light through the color filter toward the light ray input terminal so as to produce a variable lighting effect through the light ray output terminals which are spread over the artificial landscape in the aquarium.

2 Claims, 2 Drawing Sheets

AQUARIUM ORNAMENT LAMP SOURCE

BACKGROUND OF THE INVENTION

The present invention relates to an aquarium ornament lamp source and more particularly to an ornament lamp source which incorporates optical fibers in a lamp device to produce variable lighting effect to decorate an aquarium.

Conventional indoor aquarium which is specially made for keeping living fish, water animals and plants inside a house or building is generally attached with an illuminating equipment at the top for illumination. Fluorescent lamp is commonly used for this purpose. However, fluorescent lamp does not add beauty to an aquarium or produce any lighting effect to decorate an aquarium when it is turned on.

SUMMARY OF THE INVENTION

The present invention has been accomplished under the circumstances in view. It is therefore the object of the present invention to provide an aquarium ornament lamp source which produces variable lighting effect to decorate an aquarium.

According to the present invention, there is provided an aquarium ornament lamp source generally comprised of an optical fiber unit and a lamp source unit. The optical fiber unit is fastened inside an aquarium and comprised of a plurality of optical fibers, having one end tied up together forming into a light ray input terminal and an opposite end loosely arranged into a plurality of light ray output terminals. The lamp source unit is attached to the outside of the aquarium to match with the optical fiber unit, which comprises a base plate having a color filter wheel pivoted thereto at the top and driven by a motor to rotate, with a light source set therein at the center. When the color filter wheel is rotated, light rays from the light source penetrate through the color filter wheel into the light ray input terminal of the optical fiber unit so as to produce variable lighting effect on the artificial landscape of the aquarium through the light ray output terminals.

DETAILED DESCRIPTION OF THE PREFERRED EMBODIMENT

Figure 1:
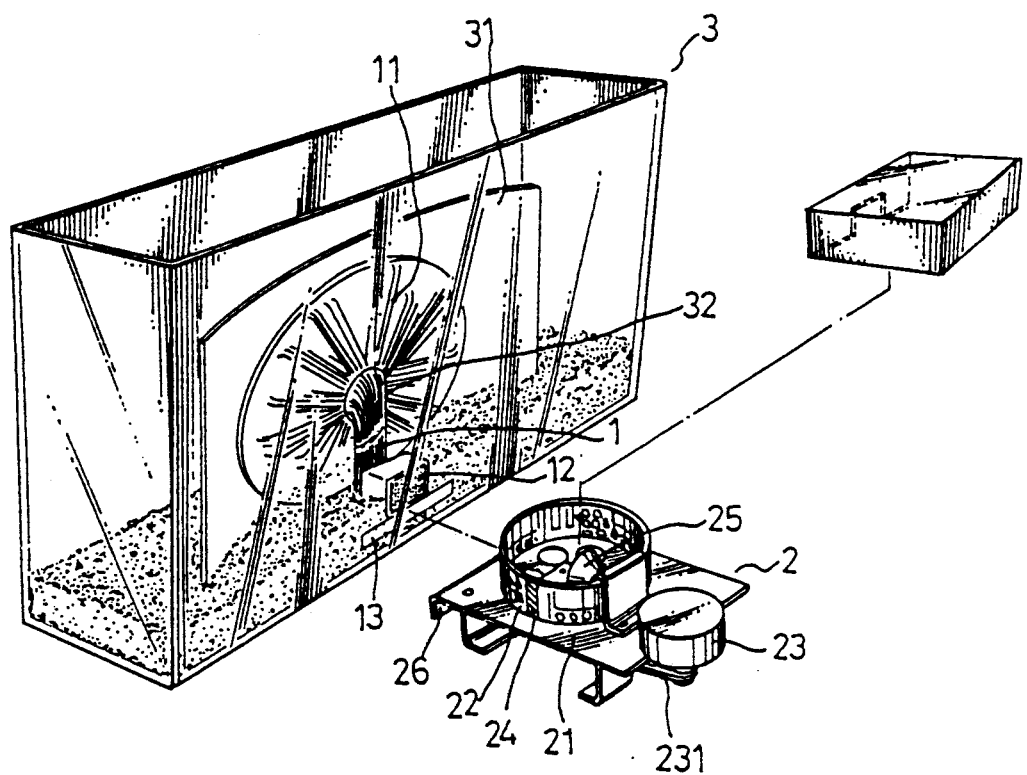
FIG. 1 is a perspective view of the preferred embodiment of the present invention.
Figure 2:
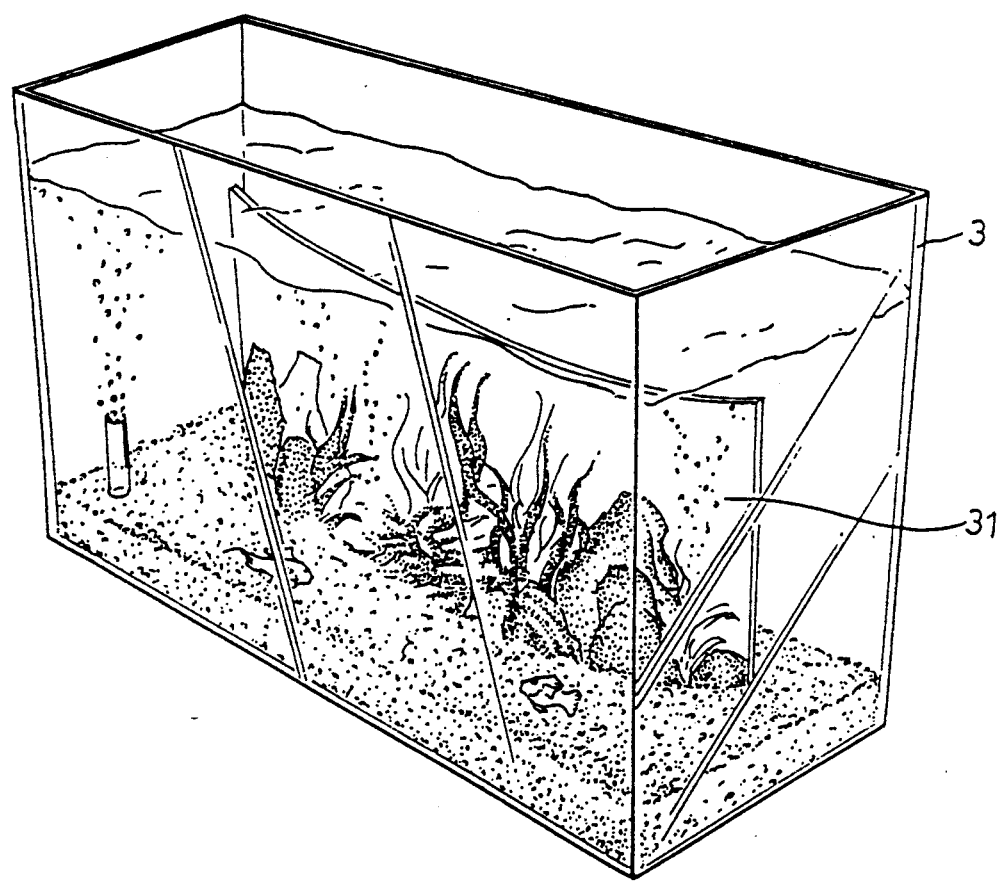
FIG. 2 illustrates an artificial landscape inside an aquarium embellished by the variable lighting effect from the ornament lamp source of the present invention.

Referring to the annexed drawings in greater detail, the preferred embodiment of the aquarium ornament lamp source of the present invention is generally comprised of an optical fiber unit 1 and a lamp source unit 2. The optical fiber unit 1 is comprised of a plurality of optical fibers which have each a rear end 12 retained together by a binding device. The front end, namely the free end 11 of each optical fiber of the optical fiber unit 1 is loosely disposed in all directions. When in installation, the optical fiber unit 1 is fastened in an aquarium 3 at the inner bottom at a suitable position with the free ends 11 of all optical fibers of the optical fiber unit 1 spreading out over the artificial landscape 31 in said aquarium 3. The artificial landscape 31 is most preferably made from foamed plastic or porous material so that optical fibers can be conveniently fastened therein. The lamp source unit 2 comprises a base plate 21 having a rotary wheel 22 pivoted thereto and driven to rotate by a motor 23 via a driving belt 231. The rotary wheel 22 has a color filter 24 around the periphery thereof, and a light source 25 at the inside. The lamp source unit 2 is mounted on the aquarium 3 at the outside to match with the rear end 12 of the optical fiber unit 1. The base plate 21 further comprises a magnet 26 disposed to match the magnet 13 which is fastened in the rear end of the optical fiber unit 1.

Operation of the present invention is outlined hereinafter. Power supply is connected to drive the motor 23 to carry the rotary wheel 22 to rotate in same direction via the driving belt 231. During rotation of the rotary wheel 22, light from the light source 25 alternatively projects through the color filter 24 onto the rear end 12 of the optical fiber unit 1. Therefore, variable color lighting is continuously emitted through the free ends 11 of all optical fibers of the optical fiber unit 1 to decorate the artificial landscape 31 of the aquarium 3. At the same time, air bubbles produced by the air pump of the aquarium 3 make the scene more attractive.

During installation of the optical fiber unit 1, the rear end 12 of the optical fiber unit 1 can be embedded in the bed inside the aquarium 3 and attached to the transparent outer wall of the aquarium 3 with the free end 11 of each optical fiber of the optical fiber unit 1 inserted through a binding tube 32 to respectively fasten in the artificial landscape 31, so that the installation of the optical fiber unit 1 does not interfere with the activity of the living fishes or animals in the aquarium 3.

By means of the magnetic attraction between the magnets 13 and 26 respectively attached to related positions of the inner side of the aquarium and the side of the base plate 21 of the lamp source unit 2, the lamp source unit 2 can be conveniently attached to the outside of the aquarium 3 opposed to the optical fiber unit 1.

I claim:

1. An aquarium ornament lamp source, comprising:
    an optical fiber unit comprised of a plurality of optical fibers, having one end tied up together forming into a light ray input terminal and an opposite end loosely arranged into a plurality of light ray output terminals;
    a lamp source unit comprising a base plate having a rotary wheel pivoted thereto at the top and driven by a motor to rotate, said rotary wheel having a color filter around the periphery thereof, and a light source set in said rotary wheel to emit light through said color filter; characterized in that:
    said bundle of optical fibers is fastened in an aquarium with said light ray output terminals loosely attached over the artificial landscape arranged in said aquarium; said lamp source unit is attached to the outside of said aquarium with said color filter aligned with said light ray input terminal; and wherein:
    connection of power supply to said lamp source unit causes said motor to drive said rotary wheel to rotate and simultaneously causes said light source to emit light through said color filter toward said light ray input terminal so as to produce a variable lighting effect through said light ray output terminals.

2. The aquarium ornament lamp source of claim 1, wherein said light ray input terminal is attached with a magnet and said base plate of said lamp source unit is attached with a magnet to match with the magnet on said light ray input terminal so that said lamp source unit can be conveniently attached to the outside of said aquarium and attracted into position by magnetic attraction to align with said light ray input terminal of said optical fiber unit.

* * * * *